Feb. 5, 1952 J. SELZER 2,584,233
TIRE CARRIER
Filed Sept. 29, 1950 3 Sheets-Sheet 1

Inventor:
John Selzer
By: Paul O. Pipper
Attorney

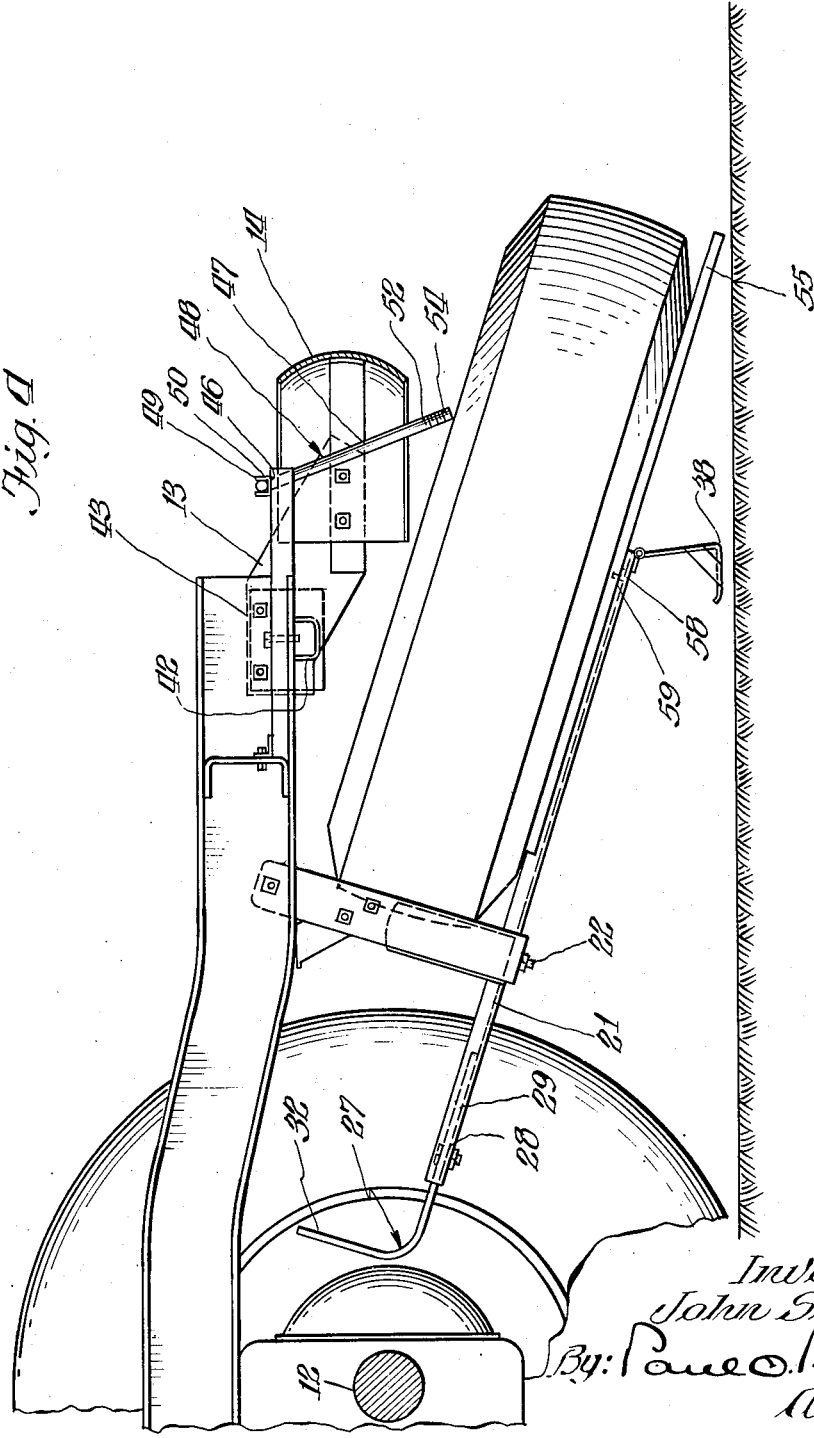

Patented Feb. 5, 1952

2,584,233

UNITED STATES PATENT OFFICE 2,584,233

TIRE CARRIER

John Selzer, Fort Wayne, Ind., assignor to International Harvester Company, a corporation of New Jersey Application September 29, 1950, Serial No. 187,466

7 Claims. (Cl. 224—42.22)

1

This invention relates to a new and improved spare tire carrier device for vehicles and more particularly to a novel underslung-type tire carrier construction.

The primary objective of the present invention is to substantially modify and improve the tire carrier structure shown in Patent 2,417,952, March 25, 1947 assigned to the assignee of the present invention by providing a device by which a spare tire may be compactly stored in an elevated position beneath the body of a vehicle and yet rendered conveniently accessible for the removal of or the replacement thereon of a tire with the greatest of ease and rapidity.

In the above mentioned patent applicants provided a tire carrier pivotally mounted in such a manner as to permit insertion of the tire and wheel unit into the carrier under the bumper. Although the tire carrier therein described accomplishes its intended objects, insertion or removal of a tire and wheel unit in or from the carrier is somewhat difficult since the clearance between the bumper and the carrier in its lowered position, while sufficient to allow the removal or replacement operation, is not great enough to give the large working space free from any obstruction of the bumper or any other parts of the vehicle desired by many. A larger working area is obtained in the present invention by the provision of a tire carrier which is slidable relatively to the tire carrier frame structure, when the frame structure is in its lowered position, to a projected position where a substantial portion of the carriage extends rearwardly of the bumper.

The foregoing and other important objects and desirable features inherent in and encompassed by the invention, together with many of the purposes and uses thereof, will become readily apparent from a reading of the ensuing description in conjunction with the annexed drawings in which, Fig. 1 is a side elevational view of the rear portion of an automotive vehicle showing a tire carrier embodying the invention positioned beneath the frame in its elevated or raised position; the broken lines represent the tire carrier in its lowered position;

Fig. 4 is a side elevational view of the tire carrier illustrating the tire carriage in its projected position for inserting or removing a tire and wheel unit.

2

Figure 1:
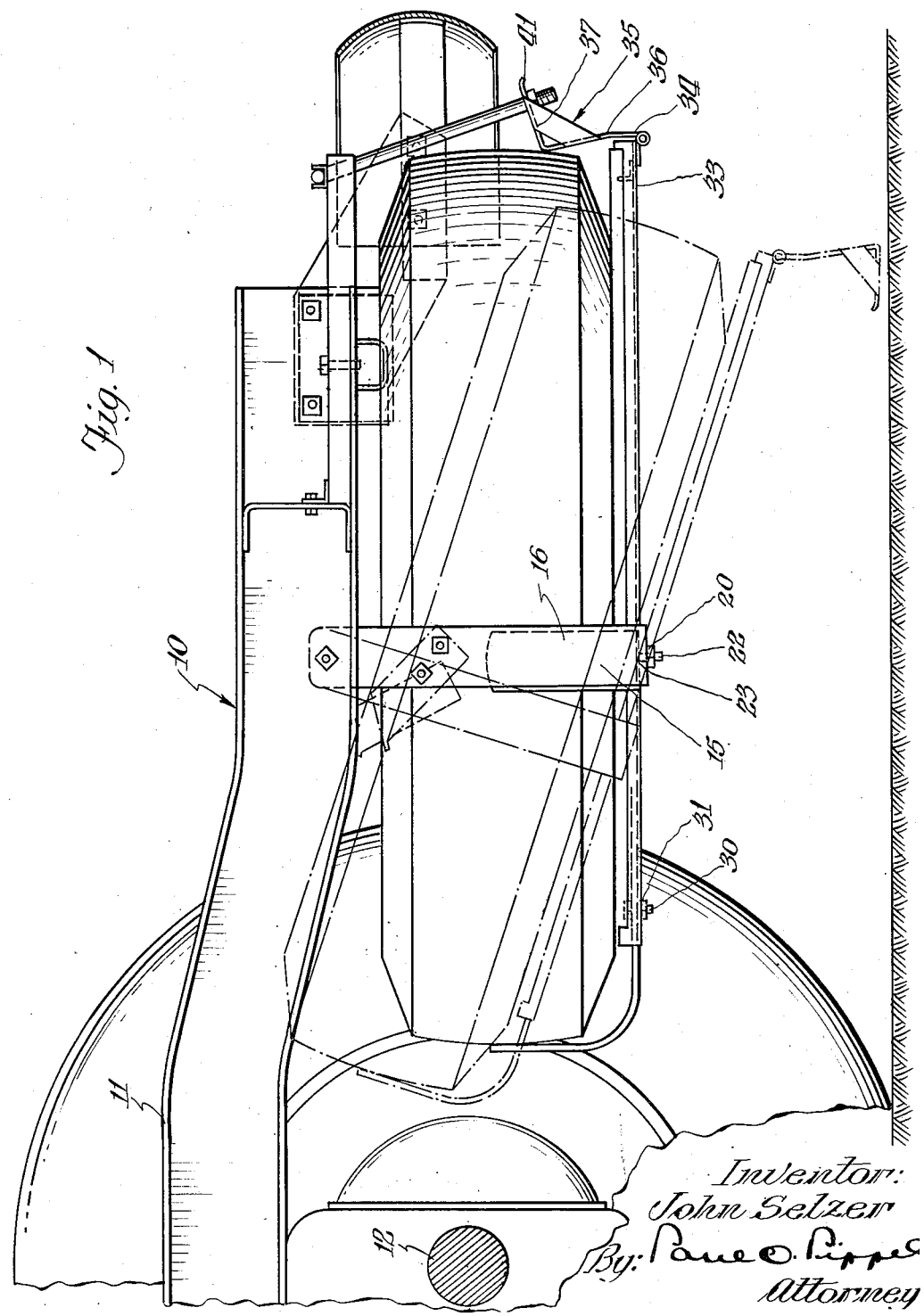

Referring to the drawings, in which like reference characters represent like elements throughout the various views, there is shown the rear portion of a conventional frame 10 having a humped section 11 to provide clearance over a rear axle structure 12. The rear axle structure 12 is shown to provide the environment for the tire carrier and, thus, it is to be understood that the invention can be applied to any automotive vehicle having a frame extending rearwardly beyond the rear axle a distance sufficient for mounting a tire and wheel unit.

Rigidly connected to the frame 10 by means of brackets 13 is a conventional bumper 14. It will be noted that the bumper 14 is vertically spaced below the frame 10 and is at a height off the ground substantially the same as that found in the majority of motor vehicles such as passenger cars and lightweight delivery trucks.

Figure 3:
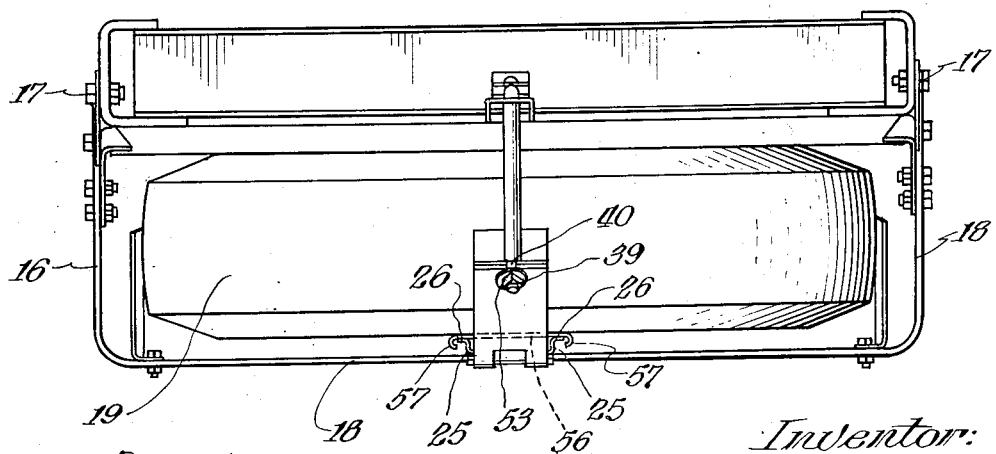
Fig. 3 is a rear elevational view of the structure shown in Fig. 1.

Positioned beneath the frame 10 intermediate the rear axle structure 12 and the bumper 14 is a U-shaped member 15, the legs 16 of which extend upwardly and are pivotally connected to the frame 10 by bolts 17. The bight section 18 of the member 15 provides a transversely extending, horizontal support for the tire and wheel unit 19, which will be designated hereinafter as a spare tire. A pair of apertures 20 are formed in the bight section 18 substantially midway between the legs 16. A longitudinally disposed member 21 is adjustably fastened to the U-shaped member by means of bolts 22 extending through a pair of apertures 23 formed therein and through the apertures 20 formed in the U-shaped member 15. A second pair of apertures 24, also alignable with apertures 20, are formed forwardly of apertures 23 in member 21 and represent a second position of adjustment of the member 21 whereby the carrier is adaptable to tires of slightly different diameter and weight. Referring to Figure 3, it will be noted that the member 21 is channel-shaped in cross section with the legs 25 extending vertically and being provided with transversely projecting flanges or track elements 26, the purpose of which will be explained hereinafter.

Adjustably attached to the forward end of the member 21 is an L-shaped tire retaining member 27. Member 27 is provided with two pairs of apertures 28 and 29 representing two different positions of adjustment, each pair being adapted to receive securing bolts 30 which pass through apertures 31 formed in member 21. The vertical portion 32 of the retaining member 27 is adapted to engage the spare tire 19 and hold the same against movement in a forward direction when stored in its elevated position. The opposite or rearward end 33 of member 21 pivotally supports one end 34 of a clamping element designated generally by numeral 35. Referring to Fig. 1, it will be noted that the clamping element 35 comprises two leg portions 36 and 37 disposed normally to each other. The juncture section 38 of the leg portions 36 and 37 serves as a stop to limit movement of the tire 19 in a rearward direction relative to the U-shaped member 15 by abutting the tire when swung upwardly to a clamping position. The outer extremity of leg portion 37 is provided with an aperture 39 into which a narrow slot 40 extends from the marginal edge 41.

Figure 2:
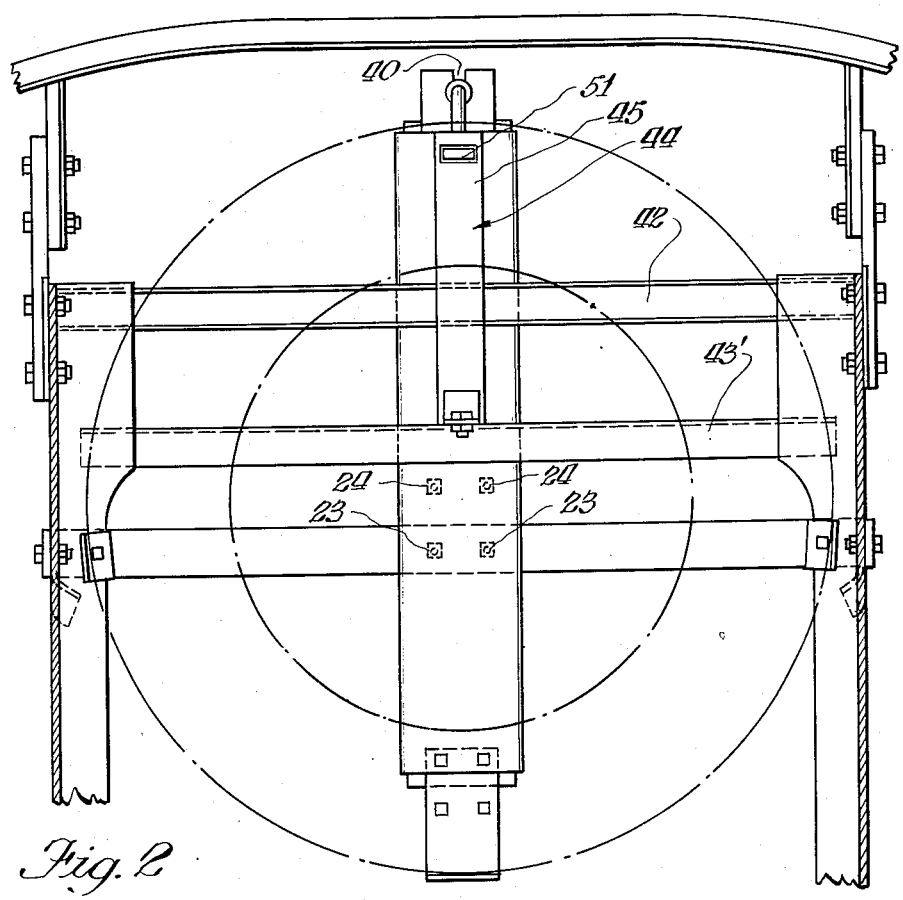
Fig. 2 is a plan view of the structure shown in Fig. 1.

A transverse member 42 formed as a channel section extends between and below the side members of the frame 10, being suitably connected thereto by depending plates 43 secured to each side member. Spaced forwardly of member 42 is a transverse rear frame member 43'. A rearwardly extending member 44 having a channel cross-section and being disposed along the longitudinal median line of the frame 10 has one end rigidly connected to the tranverse rear frame member 43 and its mid-portion resting upon and secured to the transverse member 42. The opposite or rearward end 45 of member 44 is provided with an opening 46 through which one portion 47 of a clamping element 48 extends downwardly. A U-shaped bearing member 49 bridges the opening 46 and has a slot 50 cut therein alignable with opening 46. As best shown in Fig. 2, the clamping element 48 is T-shaped, the horizontal portion 51 being adapted to seat in the bearing member 49. The lower end 52 of portion 47 is swingable to a clamping position wherein it enters the narrow slot 40 of the clamping element 35 when clamping element 35 is simultaneously swung upwardly. Further pivotal movement of the clamping elements 35 and 48 causes the portion 47 to enter the aperture 39. A threaded nut 53 is engageable with a threaded section 54 formed on the lower end 52 of portion 47 to lock the tire carrier in its elevated position as best shown in Fig. 1.

Resting upon the longitudinally disposed member 21 and supported thereby is a tire carriage 55. The tire carriage, in the present invention, has a flat plate section 56 running substantially the length of the member 21. The transversely spaced marginal edges 57 of the plate section 56 are curved downwardly and inwardly to partially embrace the flanges 26 of member 21. It will be obvious from the above described construction that the tire carriage 55 may slide longitudinally wtih respect to member 21 but is constrained from moving transversely thereof. In order to limit the rearward movement of the carriage 55 with respect to member 21 an upwardly projecting stop element 58 fixed to member 21 is adapted to abut a similar stop element 59 formed on the carriage 55 when the carriage is in its projected or extended position as shown in Fig. 4.

To operate the device when the operator desires to insert a spare tire or a tire and wheel assembly into the carrier, the nut 53 is unscrewed sufficiently by a suitable wrench to allow disengagement of the clamping elements 35 and 48. Inasmuch as the pivot for the tire carrier on the bolts 17 is somewhat to the front the unit will drop by gravity into the position shown in broken lines in Fig. 1. The tire carriage 55 may then be slid rearwardly to its extended or projected position as shown in Fig. 4. It will be noted that in this position a substantial portion of the tire carriage 55 is rearwardly of and well below the bumper 14 to facilitate the placement or removal of a spare tire on or from the carriage free from any obstruction of the bumper. The spare tire placed on the carriage 55 and the carriage may then be slid forwardly until the tire abuts the vertical portion 32 of the tire retaining member 27 whereupon the entire carrier and wheel assembly is tilted upwardly into the position shown in Fig. 1. Comparatively little effort is required to lift the carrier and wheel assembly into the stored position, illustrated in Fig. 1, because of the location of the pivot bolts 17. The clamping elements 35 and 48 are then swung into engagement and the nut 53 is tightened. The juncture section 38 of the clamping element 35 abuts the spare tire and prevents shifting of the same rearwardly with respect to the tire carrier when clamping elements 35 and 48 are clamped tightly together.

The embodiment of the invention chosen for the purposes of illustration and description herein is that preferred for achieving the objects of the invention and developing the utility thereof in the most desirable manner, due regard being had to the improvements sought to be effected. It will be appreciated, therefore, that the particular structural and functional aspects emphasized herein are not intended to exclude, but rather to suggest, such other adaptations and modifications as fall within the spirit and scope of the invention as defined in the appended claims.

What is claimed is:

1. A tire carrier construction for vehicles having a longitudinal frame extending rearwardly of the vehicle and a bumper connected to the frame and positioned substantially below the level and rearwardly thereof, comprising a tire carrier framework including a U-shaped member, the legs of the U-shaped member extending vertically and being pivotally connected on a transverse horizontal axis to the vehicle frame, additional frame structure connected to said U-shaped member and including a longitudinally disposed member secured intermediate its ends to said U-shaped member having track elements formed thereon and a forwardly extending member adjustably connected thereto at one end thereof adapted to limit the movement of the tire to be carried in a forward direction, the opposite end of said longitudinally disposed member having one portion of a clamping means pivotally carried thereby, a tire carriage supported on said longitudinally disposed member having track elements engageable with the track elements on said longitudinally disposed member and arranged to move from a projected position where a tire may be easily placed on or removed from the carriage without obstruction by said bumper to an inner retracted position where a portion of the tire abuts said forwardly extending member, said carrier framework being proportioned so that the center of gravity of the framework and a tire mounted on the carriage in its retracted position is rearwardly of and closely adjacent to the pivot axis of the framework, and a clamping member pivotally connected to the vehicle frame and extending downwardly for cooperation with the clamping means on the tire carrier frame structure when the tire carriage is in its retracted position.

2. A tire carrier construction for vehicles having a frame extending substantially horizontally rearwardly of the vehicle and a bumper connected to the frame and positioned substantially below and rearwardly thereof, comprising a tire carrier framework including a U-shaped member, the legs of the U-shaped member extending vertically and being pivotally connected on a transverse horizontal axis to the vehicle frame, additional frame structure connected to said U-shaped member including a longitudinally extending member secured intermediate its ends to said U-shaped member having track elements formed thereon and a forwardly extending member adjustably connected to said longitudinally extending member at one end thereof adapted to limit the movement of the tire to be carried in a forward direction, the opposite end of said longitudinally disposed member having a first vertically swingable clamping element connected thereto, a tire carriage supported on said longitudinally extending member having track elements engageable with the track elements on said longitudinally extending member and arranged to slide thereon between a projected position beneath the bumper where a tire may be easily placed on or removed from the carriage without obstruction by said bumper and an inner retracted position where a portion of the tire abuts said forwardly extending member; and a second clamping element pivotally supported by said frame capable of swinging vertically downwardly for cooperation with said first clamping element when said first clamping element is swung upwardly to a clamping position, said first clamping element having a stop portion spaced from its pivot axis and positioned to abut the tire to be carried by the tire carrier frame structure when said clamping elements are in their clamping position thereby limiting movement of the tire in a rearward direction relative to the tire carrier frame structure.

3. A tire carrier construction for vehicles having a frame extending substantially horizontally rearwardly of the vehicle and a bumper connected to the frame and positioned substantially below the level and rearwardly thereof, comprising a tire carrier framework including a U-shaped member, the legs of the U-shaped member extending vertically and being pivotally connected on a transverse horizontal axis to the vehicle frame, additional frame structure connected to said U-shaped member and including a forwardly extending member for limiting movement of the tire to be carried in a forward direction, a rearwardly extending member having one portion of a clamping means connected thereto, and a tire carriage slidably supported on said U-shaped member adapted to move from a projected position where a tire may be easily placed on the carriage without obstruction by said bumper to an inner retracted position where a portion of the tire abuts said forwardly extending member, said tire carrier framework being proportioned so that the center of gravity of the framework and a tire mounted on the carriage in its retracted position is rearwardly of and closely adjacent to the pivot axis, and a clamping member pivotally connected to the vehicle frame and extending downwardly for cooperation with the clamping means on the tire carrier frame structure when the tire carriage is in its retracted position.

4. A tire carrier construction for vehicles having a frame extending rearwardly of the vehicle, comprising a tire carrier frame structure including a U-shaped member, the legs of the U-shaped member extending vertically and being pivotally connected on a transverse horizontal axis to the vehicle frame, additional frame elements connected to said U-shaped member and including a forwardly extending member for limiting movement of the tire to be carried in a forward direction, a rearwardly extending member having one portion of a clamping means connected thereto, and a tire carriage slidably supported on said U-shaped member adapted to move between an inner retracted position and a projected position, and a clamping member movably connected to the vehicle frame and extending for cooperation with the clamping means on the tire carrier frame when the tire carriage is in its retracted position.

5. A tire carrier construction for vehicles having a longitudinal frame extending rearwardly of the vehicle, comprising a tire carrier frame structure including a U-shaped member, the legs of the U-shaped member extending vertically and being pivotally connected on a transverse horizontal axis to the vehicle frame, said structure further including a longitudinal disposed member secured to said U-shaped member having track elements formed thereon and a forwardly extending member adjustably connected to one end of said longitudinally disposed member for limiting movement of the tire to be carried in a forward direction, the opposite end of said longitudinally disposed member having one portion of a clamping means connected thereto, a tire carriage supported on said member having track elements engageable with the track elements on said longitudinally disposed member and arranged to slide thereon between an inner retracted position and a projected position, and a clamping member movably connected to the vehicle frame and extending toward and for cooperation with the clamping means for the tire carrier frame structure when the tire carriage is in its retracted position.

6. A tire carrier construction for vehicles having a horizontally extending frame, said frame having a transverse rear frame member, comprising a tire carrier frame structure including a rearwardly extending member providing a support for the tire and having a first vertically swingable clamping element connected thereto, a horizontally extending member secured to said transverse rear frame member having a second clamping element pivotally connected to said horizontally extending member capable of swinging vertically downwardly for cooperation with said first clamping element when said first clamping element is swung upwardly to a clamping position, said first clamping element having a stop portion spaced from its pivot axis and positioned to abut a tire to be carried by the tire carrier frame structure when said clamping elements are in their clamping position thereby limiting movement of the tire in a rearward direction relative to the tire carrier frame structure.

7. A tire carrier construction for vehicles having a horizontally extending frame, said frame having a transverse rear frame member, comprising a tire carrier frame structure including a U-shaped member, the legs of the U-shaped member extending vertically and being pivotally connected on a transverse horizontal axis to the vehicle frame, additional frame elements connected to said U-shaped member including a longitudinally disposed member secured intermediate its ends to said U-shaped member and having a forwardly extending member adjustably connected thereto at one end thereof adapted to limit the movement of the tire to be carried in a forward direction, the opposite end of said longitudinally disposed member having a first vertically swingable clamping element connected thereto, a second clamping element pivotally supported by said transverse rear frame member capable of swinging vertically downwardly for cooperation with said first clamping element when said first clamping element is swung upwardly to a clamping position, said first clamping element having a stop portion spaced from its pivot axis and positioned to abut the tire to be carried by the tire carrier frame structure when said clamping elements are in their clamping position thereby limiting movement of the tire in a rearward direction relative to the tire carrier frame structure.

JOHN SELZER.

No references cited.